Feb. 12, 1952 — E. THORGRIMSSON — 2,585,354
ROTARY MOTOR

Filed July 17, 1946 — 4 Sheets-Sheet 1

INVENTOR.
Einar Thorgrimsson
BY Young, Emery + Thompson
ATTYS.

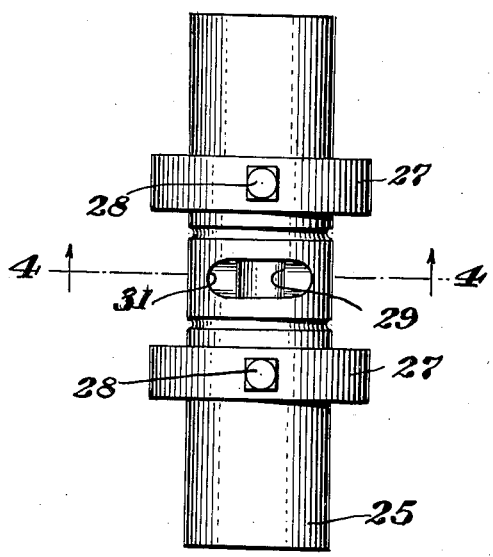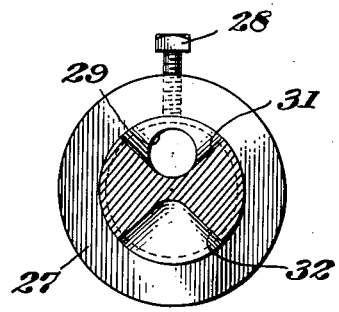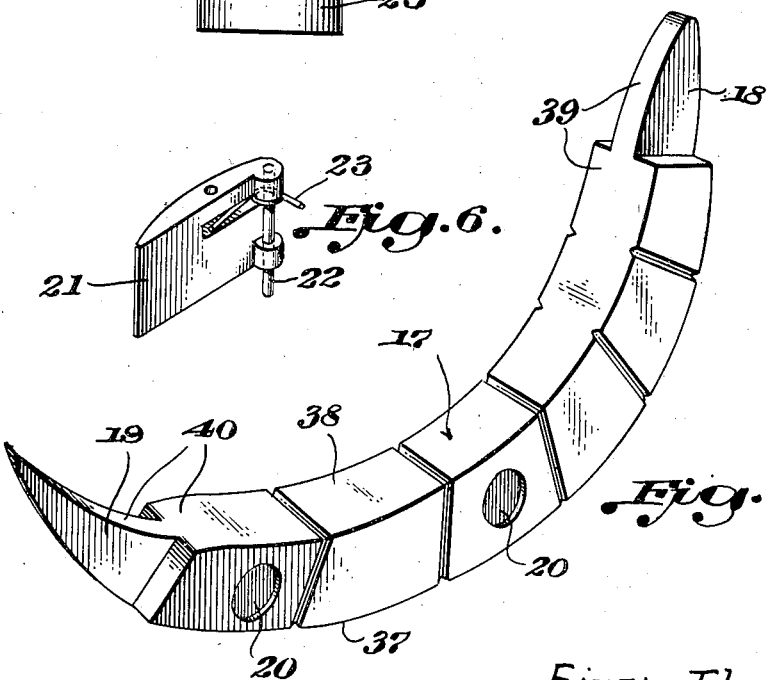

Feb. 12, 1952     E. THORGRIMSSON     2,585,354
ROTARY MOTOR

Filed July 17, 1946                                            4 Sheets-Sheet 3

Inventor
Einar Thorgrimsson

By Young, Emery & Thompson
Attorneys.

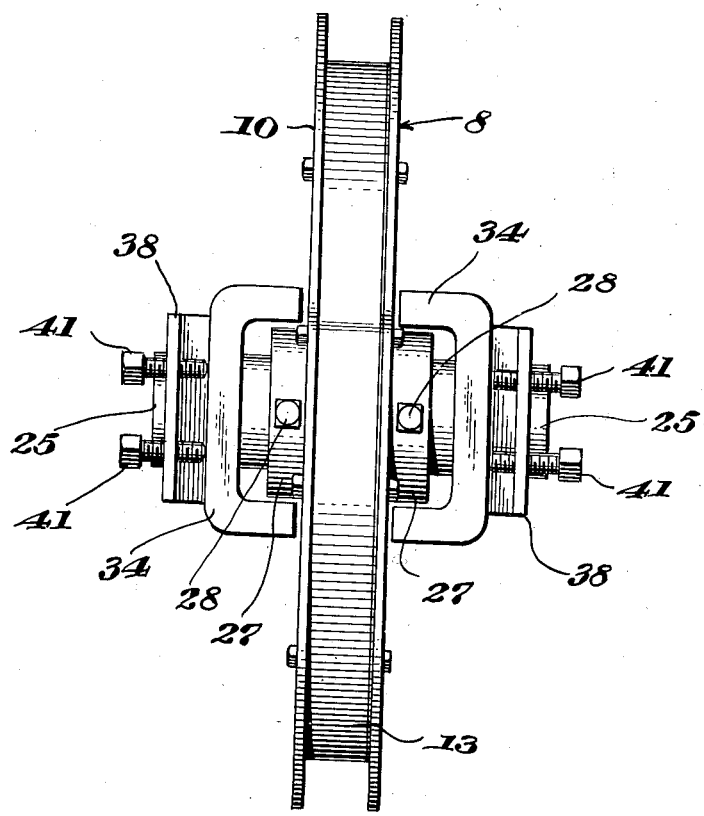

Patented Feb. 12, 1952

2,585,354

UNITED STATES PATENT OFFICE 2,585,354

ROTARY MOTOR

Einar Thorgrimsson, Reykjavik, Iceland

Application July 17, 1946, Serial No. 684,294

10 Claims. (Cl. 121—56)

This invention relates to a motor or engine which is equally adaptable to be used as a pump or compressor, an internal combustion engine, or any fluid operated power or service unit.

It is an object of the invention to provide a rotary motor which operates in a vertical plane with the rotary axis in a horizontal position. It is a further object of the invention to provide a floating piston or abutment which is held by gravity or by a magnet in its bottom position relative to the path of the rotary casing. Another object of the invention resides in a rotary motor in which a floating abutment operates a series of flap valves or expansion chamber closures.

A further object of the invention resides in a rotary motor having a stationary shaft around which the casing rotates, but with the shaft adjustable in a rotary relationship to control the speed as well as the starting and stopping of the motor. For this purpose, the shaft is provided with inlet and outlet passages for the motive fluid.

Another object of the invention resides in the provision of one or more stationary magnets on each side of the motor with such magnets adjustable toward or from the rotary casing so that each magnet will exert the same force on the abutment to reduce friction between the abutment and casing to a minimum.

Further objects will be apparent from the following description when considered in connection with the accompanying drawings which show two preferred forms of the invention, and in which:

Figure 3 is a plan view of the shaft,

Figure 4 is a cross section taken on line 4—4 of Figure 3,

Figure 5 is a perspective view of the floating abutment.

Figure 6 is a perspective view of one of the flap plates or closures,

Figure 8 is a side elevation of the modified motor.

Figure 1:
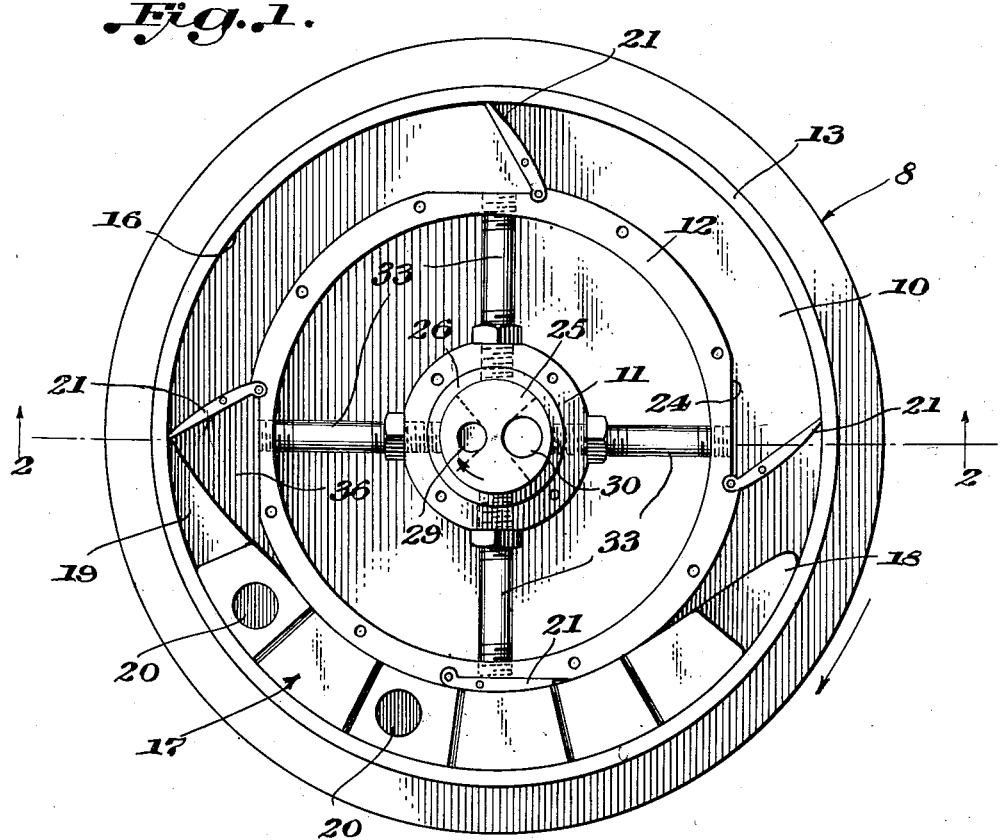
Figure 1 is a side plan view of the motor with the outside plate removed.
Figure 2:
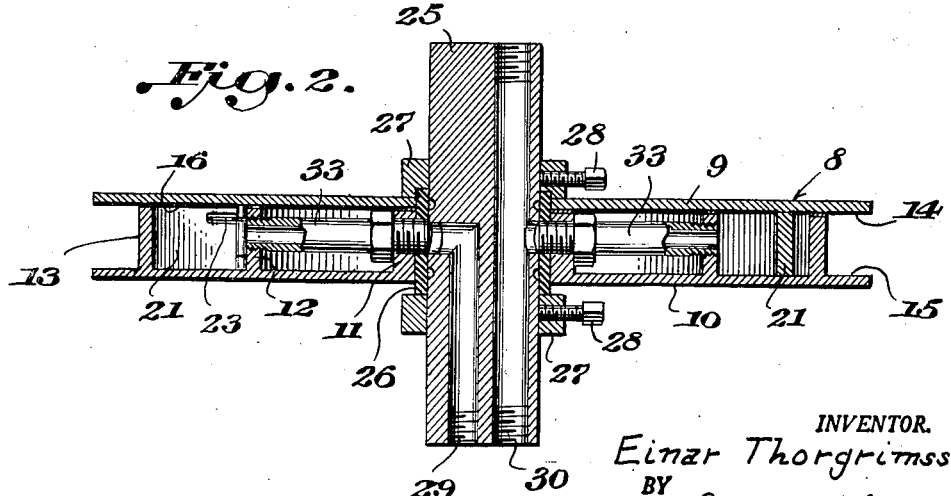
Figure 2 is a sectional view taken on line 2—2 of Figure 1.

The casing 8 of the motor may be made in any number of parts or sections, but in a preferred construction such casing consists of a plate 9 and a second plate 10 having a plurality of annular ring members 11, 12 and 13 concentrically arranged as best shown in Figs. 1 and 2. The annular rings 12 and 13 are preferably provided with threaded holes 14 to receive a plurality of bolts, not shown, for the purpose of securing the plate 9 on the ring members, preferably with the aid of ring gaskets, not shown. As the motor can take the form of a pulley for power-take-off purposes, the plates 9 and 10 form the side peripheral faces of the pulley track 14 and 15 and the ring member 13 forms the bottom of the pulley.

A concentric passage or chamber 16 is formed adjacent the pulley portion by means of the ring members 12 and 13, and the plates 9 and 10 and in this passage the floating piston or abutment 17 is provided. Since the chamber 16 is square or rectangular in cross section, the abutment is likewise square or rectangular in cross section with a pointed cam member 18 and 19 at each end thereof. This abutment is elongated and crescent-shaped and is rather heavy, the purpose of which is to tend to remain in the bottom of the passage 16. The abutment is preferably made of iron or steel and if necessary, drilled out sections 20 may be filled with lead or other heavy metal to increase the weight of the abutment. It is, of course, obvious that the passage 16 and the abutment may be circular instead of square, and these parts may also be made in other shapes and corresponding cross sections.

A plurality of flap closures 21, four or more in number, are pivotally mounted in or to the ring member 12 on pins 22 and each is spring urged by means of a spring 23, Fig. 6, to constantly urge each flap closure against the ring members 13. As best shown in Fig. 1, the ring member 12 is provided with a slight cut-away portion 24 for each flap closure, so that when the rotary casing 8 together with the flap closures pass the abutment 17 sufficient clearance will permit the abutment to pass or be moved out of the way as shown by the bottommost flap closure 21 in Fig. 1.

The casing 8 rotates on a shaft 25 by means of a bearing sleeve 26. A retaining ring 27 with a set screw or bolt 28 is provided on each side of the casing and thus the sleeve 26 and casing 8 rotate on the shaft 25 between the retaining rings 27. The shaft 25 is provided with a longitudinal passage 29 and a second passage 30. A cut-out portion 31 in the shaft is in communication with passage 29 and a cut-out portion 32 in the shaft is in communication with passage 30. The shaft 25 may be adjusted in a rotary direction for the purpose which will be explained, and each passage may be threaded at the ends to connect flexible hose or tubes, not shown, thereto.

In the casing 8 there are provided four tubes 33 arranged radially in and between the ring portions 12 and 11, and extending into the sleeve 26. These tubes 33 provide for the passage of the motive fluid to and from the power chambers.

Figure 7:
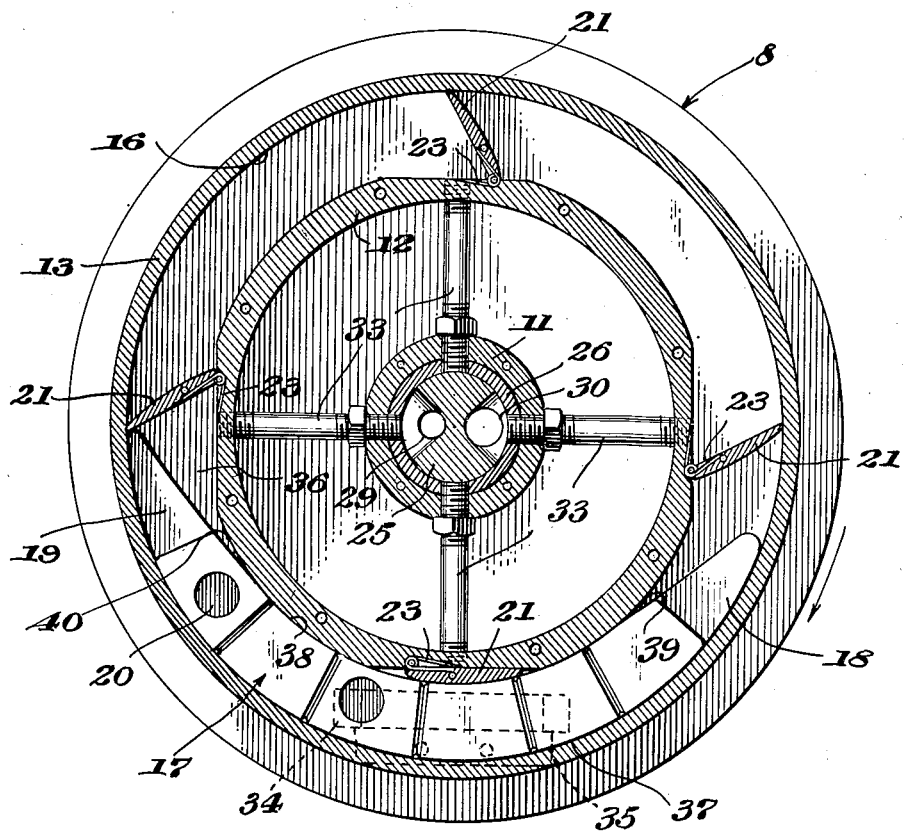
Figure 7 is a diametrical section through a modified motor.

The structure shown in Fig. 7 is exactly the same as Fig. 1 except that in Fig. 7 means has been added to maintain or to add to the force of gravity to tend to keep the floating abutment in the bottom or side of the expansion chambers. Such means includes a stationary magnet, such as the permanent magnet 34, Fig. 7, fixed by suitable means such as a bracket 35 on each side of the casing 8. It is, of course, obvious that an electro-magnet may be used. In this form of the invention, the floating abutment 17 would be made of iron, but the rest of the structure, particularly the casing 8, would be made of non-magnetic metals or alloys. Each magnet 34, Fig. 8, is adjustable by means of adjusting screws 41 in order to adjust each magnet toward or away from the casing 8. This is for the purpose of imparting equal forces on the abutment to maintain the latter in a true floating relationship. The magnets may be secured at the bottom of the casing as shown in Fig. 7 or at one side as shown in Fig. 8, that is, with the magnets in a horizontal plane with the shaft. In other words, the magnets may be arranged at the bottom or at 90° thereto, and in Fig. 8, the motor is arranged to operate at 90° relative to the position of the parts in Fig. 7.

The motor operates as follows:

Any suitable motive fluid may be used, such as steam, water, air, gases, etc., and assuming the parts are in the positions shown in Figs. 1 and 7, motive fluid will enter passage 29 and left-hand tube 33, Figs. 1 and 7, into chamber 36. The fluid under pressure reacts against the flap closure 21 and abutment 17, and due to the weight of the latter or the force of the magnet 34 thereon, the casing 8 will tend to move clockwise, in the direction of the arrow, on the shaft 25. When the bottom tube 33, Figs. 1 and 7, reaches a substantially horizontal position during the rotation, the motive fluid will begin to fill up the next adjacent expansible chamber and the preceding one will be cut off and begin to exhaust through cut-out portion 32 and passage 30. Thus, a succession of or constant power medium charges are applied which will create or impart a uniform speed in the casing in dependence upon the pressure of the motive fluid or its entry control.

The motor operates in the position shown in Figs. 1, 7 and 8, that is, in a vertical position on a horizontal axle, but if the form of the motor is used as shown in Figs. 7 and 8, with the magnets, the motor can operate in a horizontal plane or in any angular position, since then the magnet may be used exclusively to tend to hold the abutment in a fixed position. In the motor without the magnet, such position of operation must be vertical, since gravity is relied on to tend to maintain the abutment in its bottom position. As a matter of fact, with a load on the motor, the piston 17, in Fig. 1 tends to assume a position toward the right.

The cam 18 acts to gradually fold the closure flaps 21 into the cut-out portions 24, and the cam 19 acts to gradually permit the flaps 21 to again contact the ring member 13 by the action of each respective spring 23 to reduce the noise as much as possible, and thus obtain a smoother operation of the motor.

The various parts of the motor may be made of any suitable materials, such as steel, hard brass, stainless steel, and various types of alloys. However, in the form of the invention of Figs. 7 and 8, the casing and all parts, except the abutment, must be made of non-magnetic material, so that the magnet will be effective only on the abutment.

The motor may be mounted in suitable supports, not shown, for the two ends of the shaft 25, and it is, of course, understood that the chamber 16 may be lubricated for the abutment 17, and the flap closures 21 by means of a lubricant which may enter with the motive fluid, or by other means.

The piston 17 comprises an outer surface 37 which is a true arc, but the inner surface 38 is only a true arc to the cam surfaces 39 and 40, these surfaces 39 and 40 coacting with the flap closures 21 to gradually close and open the latter.

It will be obvious from the drawing that by adjusting the shaft 25 on its longitudinal axis, the positions of the inlet and outlet passages in the shaft will be adjusted which will result in different timing for the inlet of the motive fluid, and thus the speed of the motor may be controlled.

The output of the motor depends upon the weight of the abutment or upon the force of the magnet tending to hold the abutment stationary. Thus the weight of the abutment and the magnetic force are so calculated to take care of the maximum output. It is, of course, obvious, and within the scope of this invention, to modify the structure within the scope of the appended claims.

I claim as my invention:

1. In a rotary motor and the like, a rotary casing having an annular passage therein, a floating abutment in said passage, and means tending to maintain the abutment in a stationary position.

2. In a rotary motor and the like, a rotary casing of non-magnetic material having an annular passage therein, a floating abutment in said passage of a magnetic material, and a stationary magnet adjacent the casing cooperating with the abutment to maintain the latter in a stationary position.

3. In a rotary motor and the like, a stationary shaft, a rotary casing mounted on said shaft, a floating abutment in said casing, and means to maintain the abutment stationary during the rotation of the casing.

4. In a rotary motor and the like, a stationary shaft, a rotary casing mounted on said shaft, a floating abutment in said casing, and a magnet mounted in fixed relationship to react on the abutment to maintain the latter stationary.

5. A rotary motor comprising a rotary casing having an annular passage or expansion chamber therein, a floating abutment in said passage, means on each side of the casing to tend to maintain the abutment in a stationary position, and means to impart a motive fluid into and out of the passage.

6. A rotary motor comprising a rotary casing having an annular passage or expansion chamber therein, a floating abutment in said passage, a magnet on each side of the casing to tend to maintain the abutment in a stationary position, and means to impart a motive fluid into and out of the passage.

7. A rotary motor comprising a rotary casing having an annular passage or expansion chamber therein, a floating abutment in said passage, means on each side of the casing to tend to maintain the abutment in a stationary position, means to impart a motive fluid into and out of the passage, and a plurality of flap closures pivotally mounted in the passage in spaced relationship to form successive expansible chambers with the abutment as the casing rotates.

8. A rotary motor comprising a rotary casing having an annular passage or expansion chamber therein, a floating abutment in said passage, means on each side of the casing to tend to maintain the abutment in a stationary position, means to impart a motive fluid into and out of the passage, and a plurality of spring-pressed closures pivotally mounted in the passage in spaced relationship to form successive expansible chambers with the abutment as the casing rotates and the abutment successively actuates the closure flaps.

9. A rotary motor having a rotary casing with an annular expansible chamber therein, and a floating abutment in the chamber, comprising at least one stationary magnet on each side of the casing to tend to maintain the abutment in a stationary position.

10. A rotary motor having a non-magnetic rotary casing with an annular expansible chamber therein, and a floating abutment of magnetic material in the chamber, comprising at least one stationary magnet on each side of the casing to tend to maintain the piston in a stationary position.

EINAR THORGRIMSSON.

REFERENCES CITED

The following references are of record in the file of this patent:

UNITED STATES PATENTS

| Number | Name | Date |
| --- | --- | --- |
| 74,172 | Turner | Feb. 4, 1868 |
| 76,274 | Turner | Mar. 31, 1868 |
| 810,366 | Bartoletti | Jan. 16, 1906 |
| 1,038,398 | Lindenberg | Sept. 10, 1912 |
| 1,307,210 | Newcomb | June 17, 1919 |
| 2,373,791 | Stewart | Apr. 17, 1945 |